US011856018B2

(12) United States Patent
Smith et al.

(10) Patent No.: US 11,856,018 B2
(45) Date of Patent: Dec. 26, 2023

(54) MANAGING TRAFFIC CONTROL IN A NETWORK MITIGATING DDOS

(71) Applicant: Level 3 Communications, LLC, Broomfield, CO (US)

(72) Inventors: Robert Smith, Irvine, CA (US); Shawn Marck, San Francisco, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 41 days.

(21) Appl. No.: 17/881,925

(22) Filed: Aug. 5, 2022

(65) Prior Publication Data

US 2022/0385533 A1 Dec. 1, 2022

Related U.S. Application Data

(63) Continuation of application No. 16/861,269, filed on Apr. 29, 2020, now Pat. No. 11,411,988, which is a
(Continued)

(51) Int. Cl.
*H04L 9/40* (2022.01)
*H04L 41/0813* (2022.01)
*H04L 41/08* (2022.01)
*H04L 45/02* (2022.01)
*H04L 41/0866* (2022.01)
*H04L 45/021* (2022.01)
*H04L 45/42* (2022.01)
*H04L 41/0816* (2022.01)
(Continued)

(52) U.S. Cl.
CPC ...... *H04L 63/1458* (2013.01); *H04L 41/0813* (2013.01); *H04L 41/0816* (2013.01); *H04L 41/0823* (2013.01); *H04L 41/0866* (2013.01); *H04L 41/0889* (2013.01); *H04L 45/02* (2013.01); *H04L 45/021* (2013.01); *H04L 45/04* (2013.01); *H04L 45/42* (2013.01); *H04L 45/745* (2013.01); *H04L 47/80* (2013.01); *H04L 63/20* (2013.01); *H04L 41/22* (2013.01)

(58) Field of Classification Search
CPC ....... H04L 29/06; H04L 12/24; H04L 12/715; H04L 12/717; H04L 12/755
See application file for complete search history.

(56) References Cited

U.S. PATENT DOCUMENTS 7,340,519 B1 3/2008 Golan et al.
2006/0256788 A1 11/2006 Donahue
(Continued)

OTHER PUBLICATIONS

Extended European Search Report, dated Nov. 12, 2018, Application No. 16756170.3, filed Feb. 23, 2016; 18 pgs.
(Continued)

*Primary Examiner* — Kyaw Z Soe

(57) ABSTRACT

Embodiments are provided for managing routes of data traffic within a network. The management may be performed via a graphical user interface that interacts with a Web server to update a configuration file. The configuration file can be converted to router management commands by a network management device (e.g., a BGP speaker). The commands can then be sent to border routers for controlling network traffic. Embodiments are also provided for capturing and logging routing updates made in a network.

35 Claims, 7 Drawing Sheets

Related U.S. Application Data continuation of application No. 16/189,580, filed on Nov. 13, 2018, now Pat. No. 10,645,116, which is a continuation of application No. 14/991,024, filed on Jan. 8, 2016, now Pat. No. 10,129,293.

(60) Provisional application No. 62/119,751, filed on Feb. 23, 2015.

(51) Int. Cl.
*H04L 41/0823* (2022.01)
*H04L 45/745* (2022.01)
*H04L 47/80* (2022.01)
*H04L 41/22* (2022.01)

(56) References Cited

U.S. PATENT DOCUMENTS

| | | |
|---|---|---|
| 2006/0272018 A1 | 11/2006 | Fouant |
| 2008/0062891 A1 | 3/2008 | Van der Merwe |
| 2008/0209334 A1 | 8/2008 | Pirbhai et al. |
| 2009/0323544 A1 | 12/2009 | Gaddis et al. |
| 2010/0142543 A1 | 6/2010 | Shaikh et al. |
| 2011/0261812 A1 | 10/2011 | Kini |
| 2011/0264822 A1* | 10/2011 | Ferguson ............ H04L 63/0227 709/235 |
| 2011/0296005 A1 | 12/2011 | Labovitz et al. |
| 2011/0296053 A1 | 12/2011 | Medved |
| 2012/0110195 A1 | 5/2012 | Schemitsch |
| 2012/0131211 A1* | 5/2012 | Schemitsch ............ G06F 16/95 709/228 |
| 2012/0290716 A1* | 11/2012 | Ogielski ................. H04L 43/04 709/224 |
| 2012/0324216 A1 | 12/2012 | Sun |
| 2013/0182710 A1* | 7/2013 | Scholl ..................... H04L 45/50 370/392 |
| 2013/0263256 A1* | 10/2013 | Dickinson ........... H04L 63/1416 726/22 |
| 2014/0029410 A1 | 1/2014 | Kannan |
| 2014/0372577 A1 | 12/2014 | Hui |
| 2014/0379929 A1 | 12/2014 | Cicic |
| 2015/0263888 A1 | 9/2015 | Hallivuori |
| 2016/0248806 A1 | 8/2016 | Smith et al. |
| 2019/0081978 A1 | 3/2019 | Smith et al. |
| 2020/0267177 A1 | 8/2020 | Smith |

OTHER PUBLICATIONS

International Preliminary Report on Patentability dated Aug. 29, 2017, Int'l Appl. No. PCT/US16/019094, Int'l Filing Date Feb. 23, 2016; 12 pgs.

International Search Report dated Jun. 23, 2016, Int'l Appl. No. PCT/US16/019094, Int'l Filing Date Feb. 23, 2016; 4 pgs.

Partial Supplementary European Search Report, dated Aug. 3, 2018, Application No. 16756170.3, filed Feb. 23, 2016; 19 pgs.

Singapore Notice of Intention to Refuse, dated Jan. 17, 2019, Application No. 11201706628T, filed Feb. 23, 2016; 1 pg.

Singapore Search Report and Written Opinion, dated Aug. 2, 2018, Application No. 11201706628T, filed Feb. 23, 2016; 6 pgs.

Written Opinion of the International Searching Authority dated Jun. 23, 2016, Int'l Appl. No. PCT/US16/019094, Int'l Filing Date Feb. 23, 2016; 10 pgs.

\* cited by examiner

Traffic Controller – Address List

| | | | | | |
|---|---|---|---|---|---|
| system messages | OK: address list loaded | | | | |

| address | action | comment | | |
|---|---|---|---|---|
| | address search ▼ | | ⊙ go | ⊗ clear |
| | | 800 characters remaining | | |

| address | age | status | comment | edit | delete |
|---|---|---|---|---|---|
| 6526 | 0d 16h 46m | divert to mitigation | 💬 | ✏️ | ⊗ |
| 0125 | 0d 16h 47m | divert to mitigation | 💬 | ✏️ | ⊗ |
| 12835 | 0d 16h 47m | divert to mitigation | 💬 | ✏️ | ⊗ |
| 106 | 1d 00h 33m | divert to mitigation | 💬 | ✏️ | ⊗ |
| 89 | 1d 11h 44m | null route | 💬 | ✏️ | ⊗ |
| 18 | 1d 14h 55m | divert to mitigation | 💬 | ✏️ | ⊗ |
| 15 | 1d 19h 51m | null route | 💬 | ✏️ | ⊗ |
| 18 | 1d 19h 51m | null route | 💬 | ✏️ | ⊗ |
| 113 | 1d 19h 51m | null route | 💬 | ✏️ | ⊗ |
| 35 | 2d 01h 20m | do not divert | 💬 | ✏️ | ⊗ |
| 36 | 2d 01h 20m | do not divert | 💬 | ✏️ | ⊗ |
| 37 | 2d 01h 20m | do not divert | 💬 | ✏️ | ⊗ |
| 38 | 2d 01h 20m | do not divert | 💬 | ✏️ | ⊗ |
| 39 | 2d 01h 20m | do not divert | 💬 | ✏️ | ⊗ |
| 45 | 2d 01h 20m | do not divert | 💬 | ✏️ | ⊗ |

FIG. 3

MANAGING TRAFFIC CONTROL IN A NETWORK MITIGATING DDOS

BACKGROUND

In a distributed network like the Internet, different computers and computer networks may be virtually connected and accessible via various routes. When a computer or computer network is under attack, e.g., a distributed denial of service (DDoS) attack, responses to the attack must be made in order to maintain the network's accessibility to other networks and computers. A team of network administrators can manually login to a router to change routing rules in response to the attack to maintain proper network operation.

But such a solution has some undesirable properties. This method does not scale, lacks efficiency, and provides little context to business managers who may want to know the who, what, when, why, and how of a change in the network.

Further, managing multiple border routers using a fragmented team of network administrators creates problems. Often, junior network administrators do not have proper certifications and are not qualified to make network changes, putting the network at risk. Also, there is little historical data that can be captured. This makes it difficult to manage route injection over time.

Embodiments of the invention address these and other problems, individually and collectively.

BRIEF SUMMARY

Embodiments are provided for managing routes of data traffic within a network. The management may be performed via a graphical user interface that interacts with a Web server to update a configuration file. The configuration file can be converted to router management commands by a network management device (e.g., a BGP speaker). The commands can then be sent to border routers for controlling network traffic.

Embodiments can allow for more automated and timely responses to provide needed routing changes, including changes in response to DDOS and other network attacks. Embodiments can provide a central point to control routing and prevent unqualified people from having access to network control, as well as logging all routing changes made. Embodiments are also provided for capturing and logging routing updates made in a network.

Other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 3 shows a system GUI for managing routing according to embodiments of the present invention.

DETAILED DESCRIPTION

When managing the routing for a computer network, networking administrators often have to manually update the routing. This can be a complicated job, especially when a network is under a DDOS or other attack. Embodiments are described for managing routing for network addresses in an efficient and controlled manner and logging changes to routing, including graphical user interfaces.

I. BGP and Routing

The Internet is a collection of connected autonomous systems, the systems under the control of one or more network operators. On the Internet, an autonomous system is a collection of connected IP routing prefixes that presents a common, clearly defined routing policy to the Internet. In a distributed network like the Internet, different computers and computer networks may be virtually connected and accessible via various routes.

Figure 1:
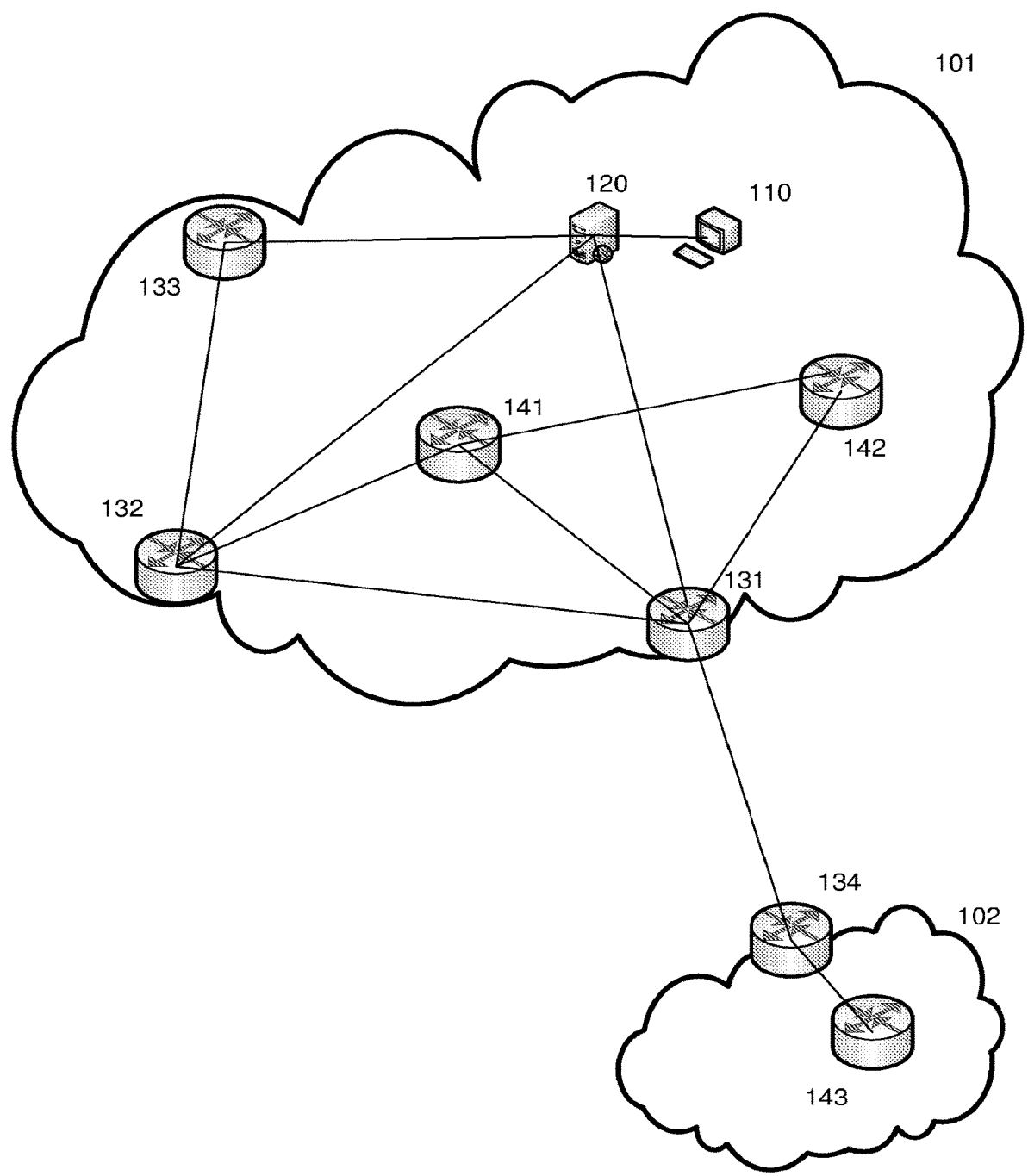
FIG. 1 is system diagram showing autonomous systems, border routers, a web server and a terminal according to embodiments of the present invention.

FIG. 1 is a system diagram showing two autonomous systems 101 and 102 according to embodiments of the present invention. Autonomous system 101 contains routers 131, 132, 133, 141, and 142. Routers 131, 132, and 133 are border routers. Terminal 110 is used by system administrators to send routing commands via webserver 120 to the border routers. Autonomous system 102 has routers 134, and 143. Border routers 131 and 134 are used to connect autonomous systems 101 and 102.

The way that the systems are connected to each other comprises the routing of the Internet. The Border Gateway Protocol (BGP) is a standardized exterior gateway protocol designed to exchange routing and reachability information between the autonomous systems on the Internet, allowing the creation of a loop-free routing topology among autonomous systems. BGP can also be used for routing within an autonomous system. Once peer machines have been configured to exchange routing information, they will form a TCP connection and can begin communicating in BGP.

As defined in at least RFCs 1771, 1997, and 4271, BGP communities are a group of destinations that share some common property. Each autonomous system administrator may define which communities a destination belongs to. By default, all destinations belong to the general Internet community. They are attribute tags that can be applied to incoming or outgoing prefixes to achieve some common goal, for example, which routing information a system accepts, prefers or distributes to other neighbors.

The community attribute allows for grouping of communities, to which common routing decisions, for example, acceptance, preference, and redistribution can be applied. Community Strings are applied by routers according to rules expressed in the router's configuration. These are commonly known as routing policies. Several common, predefined community attributes are: "no-export," which causes the route to not be advertised to external peers, "no-advertise,"

which cause the route to not be advertised to any peer, and "internet," which causes the route to be advertised to the entire Internet community.

Unlike with other protocols, BGP does not broadcast its entire routing table. Instead only upon startup, peers will hand over their entire routing table. After that time, update messages are used to change routing. Route updates are applied to the Routing Information Base (RIB), which can contain multiple paths to a destination. Each router must decide which of these routes will make it into the routing table, and thus, which paths will be used. If a route is withdrawn, another route to the same destination can be taken from the RIB, if available.

As well as using attributes, BGP uses classless inter-domain routing (CIDR) to reduce the size of the routing tables. CIDR is a process for exchanging routing information of prefixes and prefix lengths without regard to address classes (e.g., 192.168.2.0/24 for IPv4 addresses, and 2001:db8::/32 for IPv6 addresses).

Certain routers in each autonomous system can be designated as those that will run the protocol and exchange routing information. These routers, called BGP speakers, advertise BGP messages, and exchange new routing information with other BGP speakers. BGP speakers can determine a path to reach a particular destination while detecting and avoiding paths with routing loops. The routing information can include the route prefix for a destination, the path of autonomous systems to the destination, and additional path attributes.

II. System for Managing Network Routing

Traditionally, the software running on a router is managed manually (e.g., by logging in to a router) to maintain a properly functioning network to allow it to receive instructions about how to route, and also to then broadcast those routes to the rest of the Internet. Certified network administrators can change the routes and know how to change them, or at least adhere to a set of guidelines. However, there are often not necessarily enough qualified people to make the necessary changes. One possible solution is to restrict access to junior network administrators in such a manner that they are only allowed to do very specific functions, but such a restriction can cause responses to attacks to be delayed. The manual management of null routes can be overwhelming. An administrator has to take the time to log into a router and then check the keys and then commit the change. That could take quite a bit of time. The greater the number of routes, greatly increases the time that is required to manually manage them.

Figure 2:
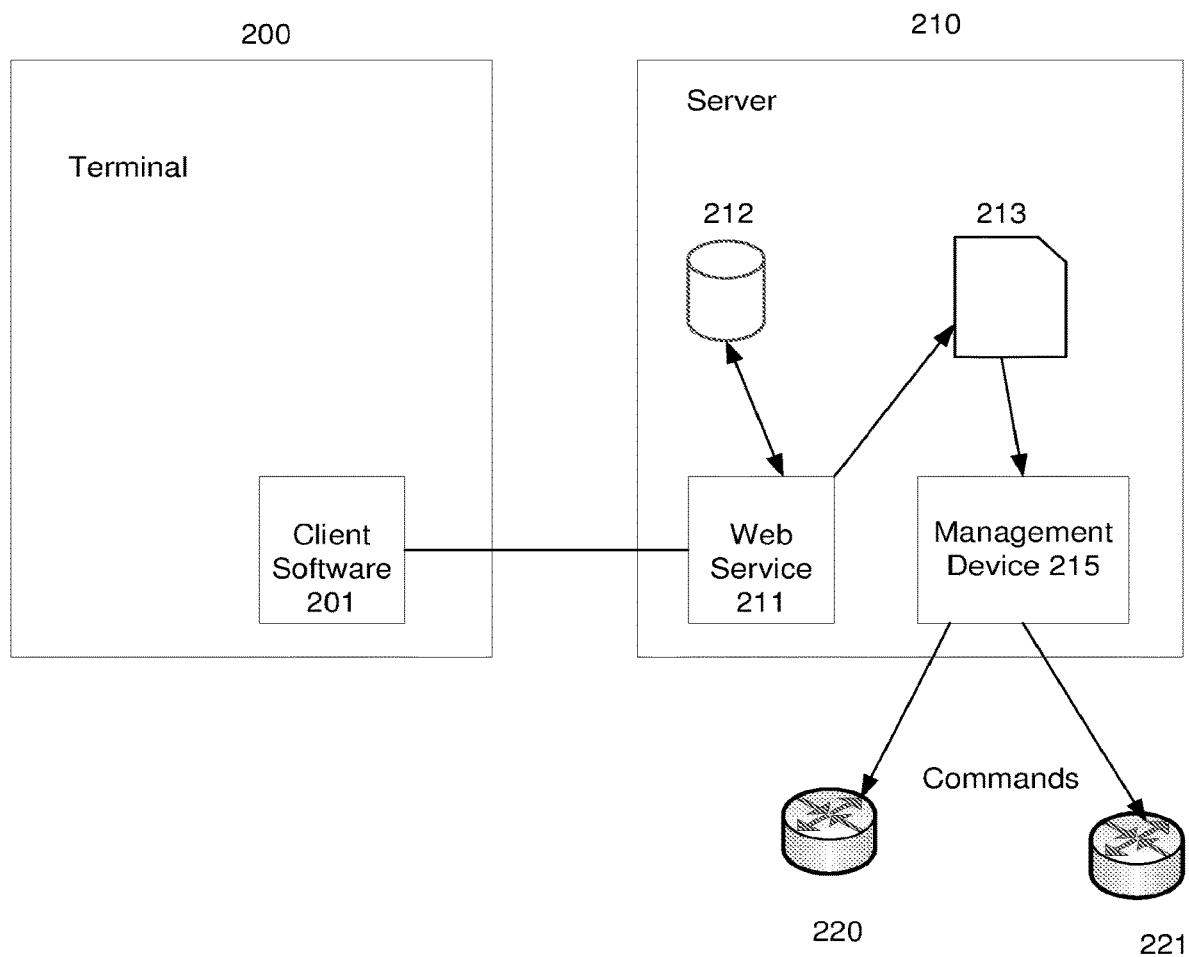
FIG. 2. is a system diagram showing a terminal and server for managing routes according to embodiments of the present invention.

FIG. 2 is a system diagram showing management of border routers according to embodiments of the present invention. Terminal 200 has client software 201 to provide information to Web Service 211. The client software 201 can be provided to terminal 200 by Web Service 211 (e.g., via a Web browser) or can be a standalone application that communicates to Web Service 211. As shown, server 210 hosts a web service 211 that client software 201 on terminal 200 connects to. Server 210 also has a database 212 to log a history of all routing changes made. A user can specify update information via client software 211, and this update information can be used to update a configuration file 213. Server 210 can maintain configuration file 213 such that it is rebuilt when changes are made. A management device 215 can read configuration file 213 and convert the information to router management commands, which are sent to border routers 220 and 221. In one embodiment, management device 215 can run BGP and act as a BGP speaker by sending out BGP commands. In various embodiments, management device 215 can be within server 210 or be separate from server 210. Border routers 220 and 221 can also act as BGP speakers. The client software can include a GUI, which provides an interface for modification of routes.

A BGP null route can be used by the system to tell upstream carriers to discard the traffic if they receive traffic for a particular destination address. Null routes can be used for a variety of purposes. A null route can be used, for example, in the event that a network device is receiving more traffic than it can handle for a particular destination address or it is receiving more traffic than a customer has subscribed to for a particular destination address. Another example use of a null route is when maintenance is being performed on a network device.

An automatic system for management of, for example, several hundred or more routes, including null routes, is desired. Such a system simplifies the process because actions applied to many routes can be performed in a couple of seconds, versus having to take the time to log into a router and then check the keys and then commit the change, which could take quite a bit of time. This can automate part of the management by streamlining it so it is easier for someone to do less amount of steps.

An automated system can also allow for additional capturing of log data. If an administrator is manually entering commands, an automated audit trail of what took place, what keys were struck and so on is not automatically generated. There is historical data that could be captured to allow administrators to manage route injection over time.

The system can act as a central point to control the routers, and the BGP speakers. It is a central point where all control of all of the border routers is done through. BGP speakers can use community information to control the routing information distributes to other neighboring border devices. Network administrators could navigate there, and instead of logging into each router, commands, like a null route, could be propagated out to a carrier, then the carrier can hold that null route no matter where it is coming from globally. Only one router might be needed in order to handle null routes.

Whoever is logged into this system software might be able to control multiple routers through a single interface. In some embodiments, there can be multiple people at the same time, possibly running the software. If network administrators are going to change any routing, it can be done through that single user interface.

When the routing system is automated, if multiple attacks occur, it may not be as overwhelming to administrators who can apply changes more quickly to potentially larger amounts of routers simultaneously. Consequently, if network administrators have to spend less time adjusting routes, then they could come up with more optimal routing, and have to use less null routing in the process to optimize the network. Keys for a route change for multiple routers can be distributed to just one interface in a few seconds, versus having one key per router.

This can simplify the usage of null routing. If there are multiple attacks be handled manually, it can be hard to get to all of them, the need may still arise to null route something in the meantime. However, with a centralized system, the needed null routing will be simplified.

There are times that ideally null routes might not necessarily be desired. A network administrator may do something a bit more finely tuned to a particular task or a particular request. There can be a lot of things that would need to be to done to make that fine-tuned coordination, which would take a considerable amount of time in a manually configured network. In a manually configured network, that might lead the administrators to actually do a null route, because that is the only thing that they can do in that quick of a time frame. With a centrally managed system there is now the ability to maybe provide the fine-tuned routing or other changes, administrators might be able to do that in the amount of time that is needed. Therefore, administrators would not need to put in a null route.

The ability to switch the router or set a router by geographic location can also exist. Often times there are a redundant pair of routers used to configure a location. When changes are made to one router, then the changes can be made on both routers. For example, it can be beneficial to have the same settings between one and two routers at the same geographic location, like the routers in Virginia or the routers in Los Angeles or the routers in San Jose or wherever there is an actual location where that change can be affected.

There can also be a method for selecting routers. The default might be all or none and then the system could select routers around one or more geographic locations. There can be an intermediate mapping table that would take locations and map them through hardware when selected, as opposed to directly going to each one.

The system can send a destination end command related to a destination address and a routing action. The system can also send out other commands to the routers besides an address and a routing action.

The system can also send out rules for a particular destination address on the network. For example, if there is a customer whose traffic is destined for Virginia, then there it might not be necessary to communicate commands globally across all routers. The system would only want to make changes on the Virginia routers.

Some parts of a routing action might not necessarily be tied to a particular destination; instead it just might be a routing action just by itself. When packets pass through a router they can pass through a firewall filter, which checks the destination address for a number of properties against that packet to see if they connect and then decides whether to keep the packet or to drop it. A routing action might be based on the type of data it is as opposed to where the data is coming from or where it is going.

Other firewall rules that might be related to a source address or a destination address. Some of those firewall rules might apply to the packet types. There are some cases where the system may want to affect traffic based on a source. It can have the effect similar to a firewall rule or routing policy when the system would want to affect a source address.

III. User Interface

The graphical user interface (GUI) interacts with a web service, as the system is web-based. The GUI takes the input selections from the user and then translates the inputs into the proper BGP commands also known as router management commands. The GUI backend stores the addresses and the requested action in a database. Every time there is a change, the system rebuilds the configuration file and pushes it out to the BGP speakers and then tells the BGP speakers to reload themselves, which is how the configuration files are used.

The GUI allows a non-expert to reconfigure BGP and do route injection, without being tied to vendor hardware or needing a network engineer to log into the router. It allows non-technical people to add, remove, and manipulate routes in a network.

On the GUI, there is the option of adding a new address or a range of addresses into the system. Administrators can force filtering so that the traffic has to go to a scrubbing center, or they can enforce no filtering so that if the system starts filtering too much traffic, it can be stopped. What this provides is actually like a manual override for overriding filtering. The GUI also allows for removing addresses from the system as well, so administrators no longer need to have this manual process for route removal and can just remove an undesired route.

FIG. 3 is a sample of a system GUI according to embodiments of the present invention. The GUI includes a blank text box for an address, a search pull down menu (e.g., to selection actions), a blank text for comments, a button labeled go, and a button labeled clear. The available action in the menu can be limited to those actions that allowed, thereby removing the danger of someone making a routing error that might be entered if someone was logged into a router.

Listed below the blank address text box is a list of partially redacted IP addresses, time applied, which is the time since a change was made in routing to the IP each address, and status. The status is indicative of the type of change made. For example, the type of change could be null route, or divert to ADS, meaning diverted to a DDOS system. The search pull down gives options to be applied to an IP address or range of addresses input in the blank text box. The range of IP addresses can be input in CIDR notation. The options the user can choose from in the search pull down menu include search, null route, divert to ADS, or do not divert. Search means that if the IP address is entered, it will search and give what the current status for that particular address or range of addresses is. A user can also input a range of addresses in CIDR notation and apply a same update to that whole range, as opposed to address by address. That update is passed on to all routers that are connected to. In one embodiment, a comment field can be provided, and sorting options for the status type can be provided.

Also in the GUI are 3 links, comment, edit, and delete. The edit for each address or group of addresses is to edit the address or group of addresses in the search box. The delete is for deletion. So administrators can delete address or group of addresses out of the system. When the address or addresses are deleted, it means that the system is no longer managing them. The status is deleted out of the configuration file as well. At that point, when it gets pushed out, when new configuration file information gets pushed out to the border routers, they do not have any information for it, so therefore they do not do anything special to it. It can just go through as any other destination that it has no rules for. The comment link allows for the insertion of comments regarding particular entries.

IV. Method for Managing Network Routing

The backend of the system can implement the changes specified in the GUI. If there is a change in routing desired, the backend rebuilds the configuration file and pushes out the changes to the BGP speakers and then tells the BGP speakers to reload themselves based on the changes specified in the GUI. Rebuilding the configuration file involves converting the contents of the configuration file into BGP routing commands. The system increases the configuration from the speaker when pushing data out to the speaker. The speaker then that tells the speaker to reload itself. There is a schedule screen in front of them that is also web-based. The actions behind it can send out the configuration files to the routers.

Figure 4:
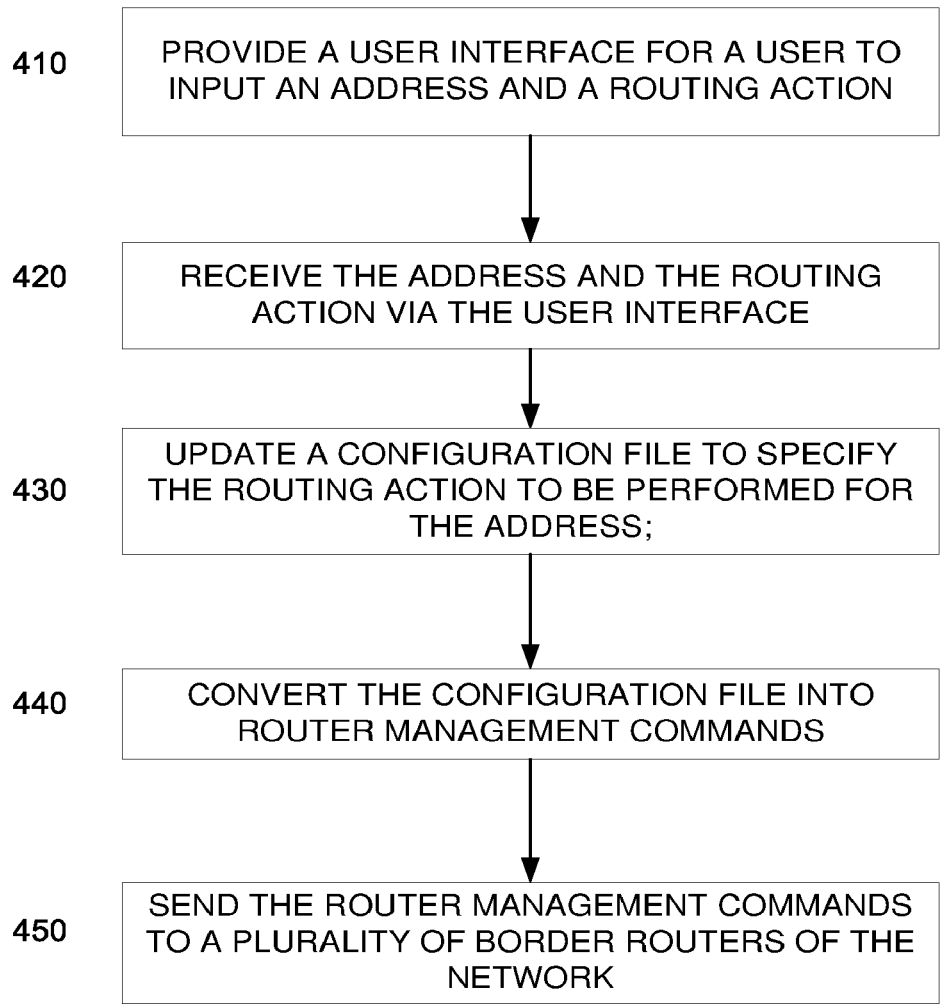
FIG. 4 is a flowchart describing inputting routing commands into a user interface and propagating the commands to the appropriate border routers of a computer network according to embodiments of the present invention.

FIG. 4 is a flowchart of a method 400 for managing routes of data traffic within a network according to embodiments of the present invention. Method 400 may be performed by a GUI, for example, the GUI as shown in FIG. 3.

At block 410, a user interface is provided for a user to input an address and a routing action. The address can be entered in CIDR format, and the routing action can include, for example, searching for the status of the address, null route to address, diverting traffic bound for the address to an ADS, or not diverting traffic bound for the address.

At block 420, the address and routing action are received to the system via the GUI. For example, a user can specify the address into the search box and select a routing action from a menu (e.g., a dropdown menu).

At block 430, a configuration file is updated to specify the routing action to be performed for the address. For example, the address and desired routing action that were input in the GUI can be updated in a configuration file in the configuration file's format.

At block 440, the updated configuration file is converted to router management commands. The configuration file is read, and the appropriate router management commands are generated. These commands can be read and understood by the routers they are sent to. In one embodiment, the commands can be BGP commands.

At block 450, the router management commands are sent to a plurality of border routers of a network or autonomous system. For example, the commands can be sent to border routers 220 and 221.

When the system sends out a configuration file to border routers, the border routers in turn can then act as BGP speakers if they need to broadcast anything else out to other parts of the Internet. On the backend of the system, the configuration file is updated. The configuration files can be converted from the existing format to commands (e.g., BGP commands) that a router can understand. The speaker then broadcasts this information to a specified set of routers.

The GUI can be web-based, and allows administrators to enter information. The information comes to the web server. From the web server, commands are sent on to the border routers (e.g., via the BGP speaker), which can be on the web server or architecturally separated. The GUI can allow administrators to specify an address, or a range of addresses, and then specify a status to be implemented. The GUI backend can receive the commands. If a command would not change the routing already in place, the system can identify it and just not do anything. For example, if for an address, if the system was to null route and address while it is already null routed, the system would compare that figure to the current configuration and see that it is already set to the same setting, and not do anything.

Once an operator makes a change on the GUI, the configuration file is updated. This update can triggers the software that causes management device/module (e.g., a BGP speaker) to convert that configuration file to router commands, and then sends those commands out through the connected routers.

The GUI can include timers and correlate the route injections. For example, if someone injects a route, e.g. null route, the system could allow administrators to see how long ago it happened, what ticket (an ID number associated with the injection) it was related to, and put a note or comment next to the event. Thus, the GUI and server can take aspects of event management and connect them to route management.

In various embodiments, timers can be used to expire a routing action, or a timer that activates a route. Administrators can set a timer, but the changes are not actually made right away. For example, a user can set a timer for the route to trigger at a particular time. Timers can be used to set a future time for which a routing action is to be used. The system can also wait until a future time to update the configuration file using timers.

In some embodiments, each record in the configuration file can correspond to a route that is injected. The record can also include metadata that is useful to the business, e.g., when it happened, why it happened, who did it, who they did it for, how many times it happened. All those things can be tracked. A database (e.g., 212) can keep track of the changes. It provides context for the business. Such context does not exist when a network administrator logs into a router and makes a change, particularly not a context across routers.

When a network administrator changes routes, adding and removing, the system can track the statistics and can see what systems need what resources more often. Administrators can get observed data that would normally not have been available if administrators were only manually entering changes into a router, unless the administrators parsed through all of the logs. But, even then administrators would be missing data, like who placed the route. Additionally, logs in the route do not track how long routes were in place for. This system can fill that gap in the data. Embodiments can include everything that is done to the network. If injecting a route, administrators can add a business context, like a note or alert. It can give context and insight to network changes.

V. System for Providing Configuration of Network Protection Across Multiple Routers Configuration of traffic control to provide proper network protection can involve a significant amount of change just for a single router. A Protection For Networks (PFN) service can provide BGP-based DDoS protection. The configuration process for a PFN product could be error prone, for example typing mistakes in the configuration can occur as there are many lines of configuration that can be needed to type in just to make changes happen. The system can streamline this process to be much faster across multiple routers. The system can also provide users a portal to set up the changes themselves. The system can be used to affect changes to routing, but it includes various methods to decrease the error rate. For example, sanity checks can be built in to examine proposed routing changes. Methods for checking proposed changes to routing configuration can result in more consistent looking configurations in routers, which can lead to a lower error rate when the system runs sanity checks against the setups. The system makes it easier to manage multiple routers at same time, allowing for management of firewall rules across many routers in a few seconds, as opposed to typing them all in manually, which is time consuming and prone to error.

The system can configure a router to set up a peering session between a monitoring network and the customer network via BGP over a tunneling protocol such as generic routing encapsulation (GRE). A user can be sent an announcement that the system preauthorized these configurations for their networks. The system can in turn re-announce out to the world when for example, another system needs to find a user's system address. When that other system asks for the user's system address, the global routing table can tell the other system that they need to go through the monitoring network and then their traffic can route to the monitoring network. The monitoring network, which can be testing and monitoring, can then pass the other system on to the customer's network.

Figure 5:
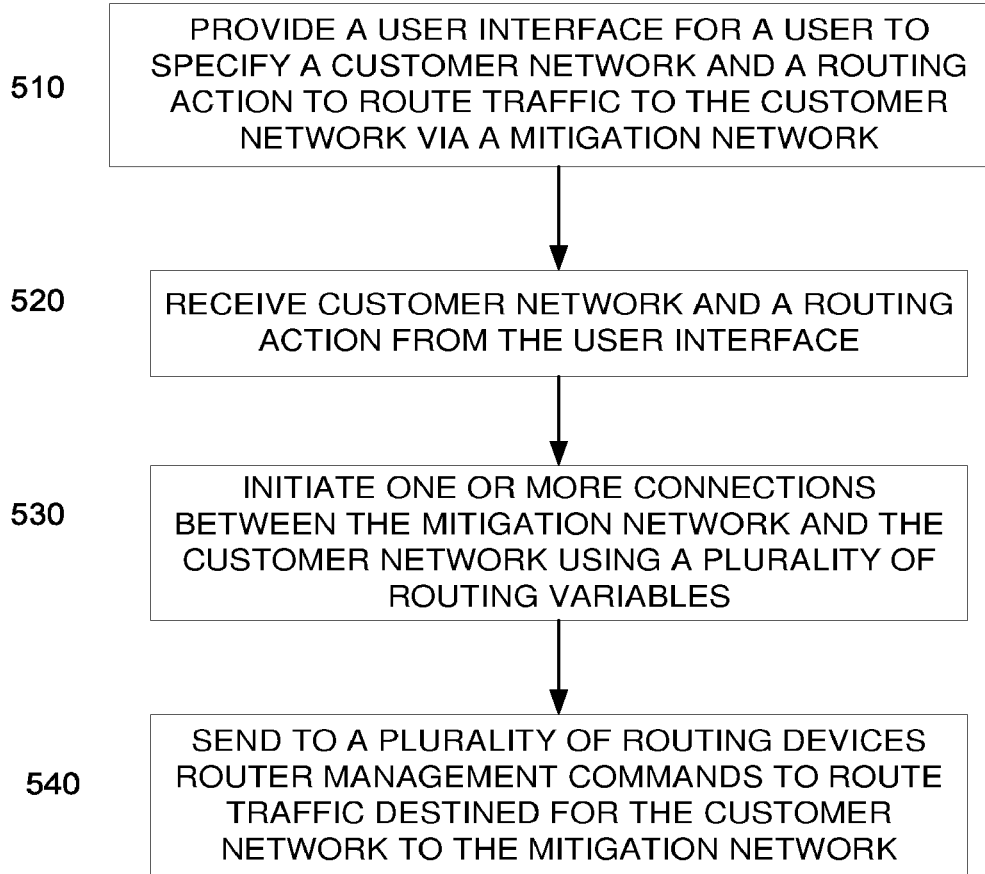
FIG. 5 is a flowchart for configuring a PFN product across one or more routers according to embodiments of the present invention.

FIG. 5 is a flowchart of a method 500 for configuring a PFN product across one or more routers according to embodiments of the present invention.

To properly configure and update such a system can take work to train someone on correct operation. The system can alleviate many of the issues with such a system by providing a format where a user can configure a monitoring network via modification of variables and selection of the routers where changes should be affected. The changes can be handled by the system in the background with much more accuracy and precision than an end user could.

At block 510, the user interface allows for inputting a customer network and a routing action to route traffic to the customer network via a mitigation network. The customer network can consist of one or more network addresses. The routing action may specify how to route to one or more of the network addresses. The customer network may be specified as a series or range of network addresses, and the addresses may be specified using CIDR notation.

At block 520, the customer network and a routing action are received from the user interface. The routing action can be specified as one or more BGP routing commands specifying how to route to and through the customer network. The BGP commands can included several operator configured variables.

The variables configured can include variables related to a tunneling protocol such as GRE. The variables configured may include a customer's tunnel endpoint for GRE. A GRE tunnel can be used to allow a customer network to talk to a monitoring network. In that respect, the system knows a router's end point and a customer's router endpoint. Those are the public addresses. The system also provides internal addresses so that when there is communications between the customer network and the internal monitoring network it happens over the internal addresses. GRE can work with four addresses, two on each side of the tunnel end. One is the external address that each router sends traffic to and from; the internal addresses are often private IP space addresses or something similar. The external addresses are the public addresses, and then the routers encapsulate the traffic for the internal address for the internal network part of it and then they send it over the public part. That is just how the GRE component of it works, which requires set up.

Other things that can be configured include a description to lead the client to the configuration. Some users may want to run different size Ethernet frames. The default is 1,500 bytes; however, because GRE is used, the largest can be 1,476 because there is a 24 byte overhead. Some users actually need more or less because they are running different protocols on their routers, which is a configurable field. There is a fragmentation bit that is often desirable to clear. Often times when the system is sending data sending larger sizes than can be accepted by the destination router often times, the data can be broken up into multiple packets, via a process called packet fragmentation. This can be fine, as customers can set their routers to reassemble packets. However, this can cause a severe load on routers, which can take huge performance hits. The system can actually try to enforce customer routers to not do that by setting a bit that would require that reassembly of packets occur on the customer side.

The system can enter all the pieces of information to be changed at the same time. It can provide interfaces for entering each piece of information including AS numbers, description, IP addresses, which routers you actually want to affect change on.

The system has policy statements that affect what we actually allow user to do. The system gives users the option to announce particular routing community strings that can affect changes on the monitoring network such as performing null routes on the user's end. The system has configuration to prevent users from sending routing prefixes which are too small to be actually be announced to the internet.

The Traffic Control system can generate configuration files, which are then pushed to the router. Users then log into a router and actually apply it. The process can involve multiple steps. The first step is to push change files to a router. Next, the files sent are checked to make sure that nothing was corrupted in the transfer. A parity check or similar integrity check can be performed on the configuration file sent over. Finally, to enact the changes the user can log in to a router and implement the changes sent over. The system allows for changes across multiple routers. There is a slightly different configuration file for each router, as each router has at least a different end point address.

At block 530, connections between the mitigation network and the customer network are initiated using various routing variables. The user interface can provide that information and part of that might be how many user tunnels, and the end points. The system creates each routing configuration files based on a template, and it is can create two different configuration files for two different routers and be able to send those out to those two different routers. The system then can allow users to log in to the routers and enact the changes.

At block 540, the router management commands are sent to routing devices to allowing routing of traffic that is destined for the customer network through the mitigation network. The router management commands can consist of BGP commands to direct the routing devices to route commands through the mitigation network. The routing decisions made by BGP can be based on paths, policies or rule-sets that have been configured network administrators.

VI. System For Performing Router Health Checks

The system can conduct router health checks among BGP speakers and routers themselves. This is part of a desire to monitor the line of communication between the system, BGP speakers, and routers, and make sure the system is operating correctly across the board. For example making sure that desired routing changes were pushed through. The system can also provide visual indicators so operators can know of problems right away.

Users can create configuration files, which are then pushed out to routers where they are enacted. When the changes are pushed to the router and the changes are actually committed, users are going to get feedback from the router saying the change was successful and accepted or not.

Figure 6:
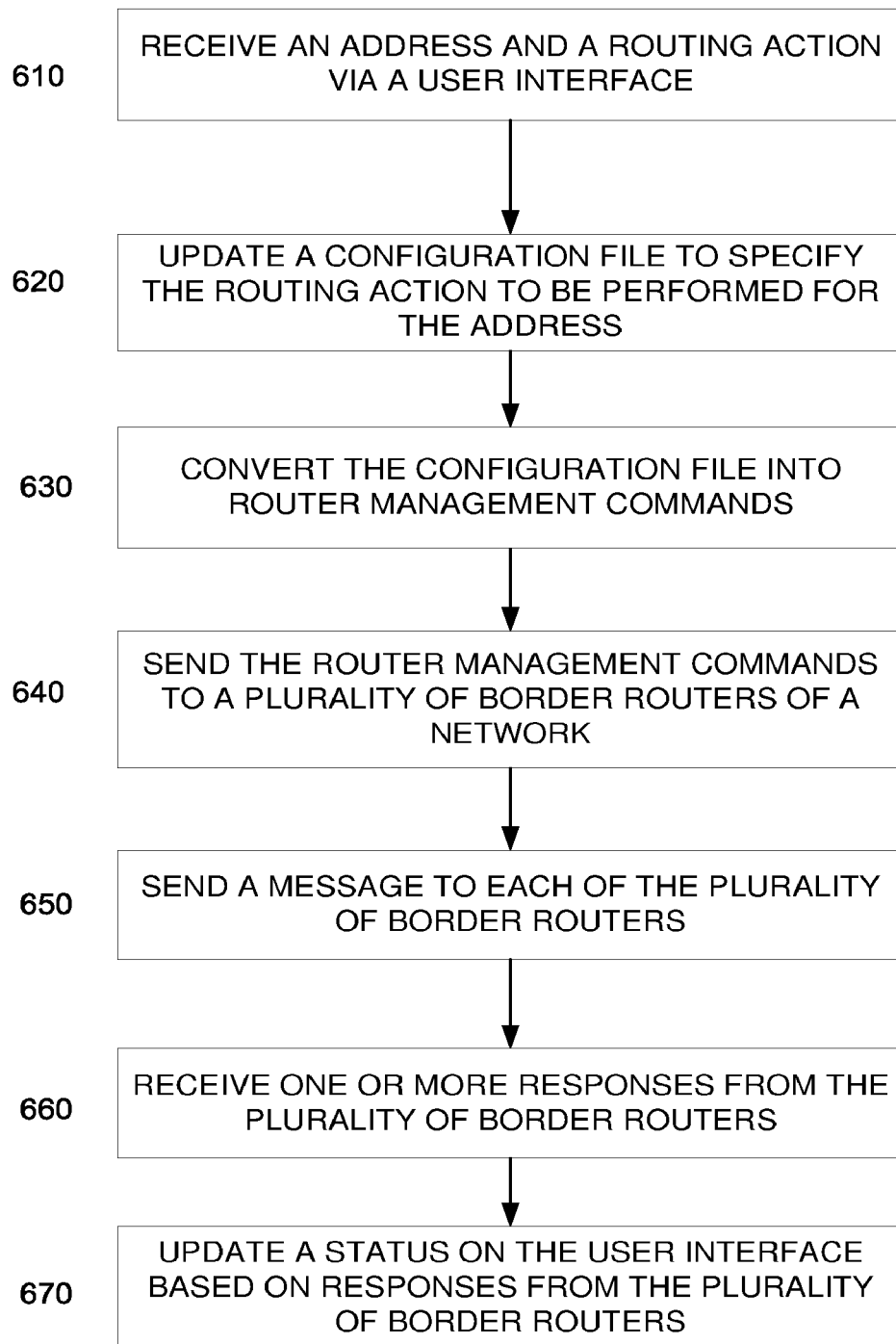
FIG. 6 is a flowchart describing conducting router health checks among BGP speakers and routers according to embodiments of the present invention.

FIG. 6 is a flowchart of a method 600 for performing router health checks according to embodiments of the present invention. At block 610, a user interface is provided for a user to receive an address and a routing action. The address can be in CIDR format, and the routing action can include, for example, searching for the status of the address, null route to address, diverting traffic bound for the address to an ADS, or not diverting traffic bound for the address.

At block 620, a configuration file is updated to specify the routing action to be performed for the address. For example, the address and desired routing action that were received can be updated in a configuration file in the configuration file's format.

At block 630, the updated configuration file is converted to router management commands. The configuration file is read, and the appropriate router management commands are generated. These commands can be read and understood by the routers they are sent to. In one embodiment, the commands can be BGP commands.

At block 640, the router management commands are sent to a plurality of border routers of a network or autonomous system. For example, the commands can be sent to border routers 220 and 221.

When users push updates and get feedback from to ensure that the changes were actually accepted and there were no conflicts. Often if there is a conflict, it can be an IP address conflict, an endpoint address or inside address conflict since GRE was already used, or perhaps the tunnel. Some of those configurations can be incorrect, and the system is letting users know that they are attempting to override with an undesirable configuration. When users make the commit to affect the change, they can query the BGP routers and speakers for feedback and can check for those things. The system can verify that the router did in fact accept or not accept those changes.

In many current systems, if users make a change, they just have to hope that it works. A user error could for example break the relationship between a traffic controller and a BGP speaker and it have it go unnoticed for almost a lengthy period of time. The health checking process can check the ability to reach out to all of the components that it configures and internally, in this case it would be the BGP speakers, but it might also reach out to individual servers and other components. The system ensures that line of communication is open and available and then taking it a step further where you actually reach out to the BGP speakers it also checks those speakers and opens those lines of communication and establish sessions with each router where they are pushing their announcements out. The system can have different indicators to indicate the status of the system, and also send out alert messages. Periodically the system can perform these checks with some or all of these particular devices.

At block 650, a message is sent to the plurality of border routers as part of the health check process to see how and if the routers respond.

At block 660, one or more responses are received from the border routers in response to the messages sent.

At block 670, the status of the system is updated based on the responses received from the border routers. If a speaker for example does not have an established session to one of the routers maybe the system actually attempts to refocus the speaker in order to reinitiate that mission. Or the system can do a ping test to that router just to see if it has an open line of communication. The system can perform various diagnostic tests to help quickly pinpoint a problem.

VII. Transparent Logging

Currently, audit trails for changes made in a traffic control system are generally not readily available. This means "phantom" changes can be made which are untraceable and can have the system not operating properly. Logging features allows visibility into which users have done what in the system, which in turn provides accountability for everyone who uses the system.

The system can take existing log files from various servers and other machines and move the log files into a database and then create a panel for it so it is actually available to end users. This alleviates the need to log into a server to access log files in specific locations with specific file names and conventions. Instead, the logs are made accessible to users so that anyone can see what other users did. All changes, especially those that had an impact it can be found.

A log of the changes made are being centralized and made accessible. Since users have that, they now automatically can have that ability to have those changes centralized because the changes are all coming from a central location instead of being entered in locally at each router.

VIII. Route Server

With multiple routers on a network, it can be useful to know what the best routes are that a network is taking to a certain destination. This system allows users to enter a destination address, and a check can be run to find a path between a particular router and that destination, and where it is going to exit the network. This can also help with troubleshooting.

The route server can be an additional server that traffic control can communicate with. The route server can be a receiver of BGP from all the routers across a network. It can forward all of the routing tables from each router and then if somebody wanted to check to see where a particular address might exit the network the route server could tell them. It can give users the ability to have a network looking glass within a traffic controller.

It is a server that then has all of the routing tables from all the other routers and it is stored there so that way you can quickly get an idea of what is going on all of the border routers.

IX. Sub-Accounts

The system may want to provide customers the ability to log in and use traffic control themselves, and manage things on a very limited basis. The idea would be to give customers an account on this system where they have the ability to manage their own address space and affect changes using it on a very limited basis. The limited sub-account can be configured to be only allowed to execute a subset of all routing actions. The limited functionality could include the ability to push changes to some of their space, and apply a particular firewall rule to it or not.

It could be a separate portal the users with scaled down functionality. Limited functionality could be provided to allow filtering on an address space.

X. Computer System

Figure 7:
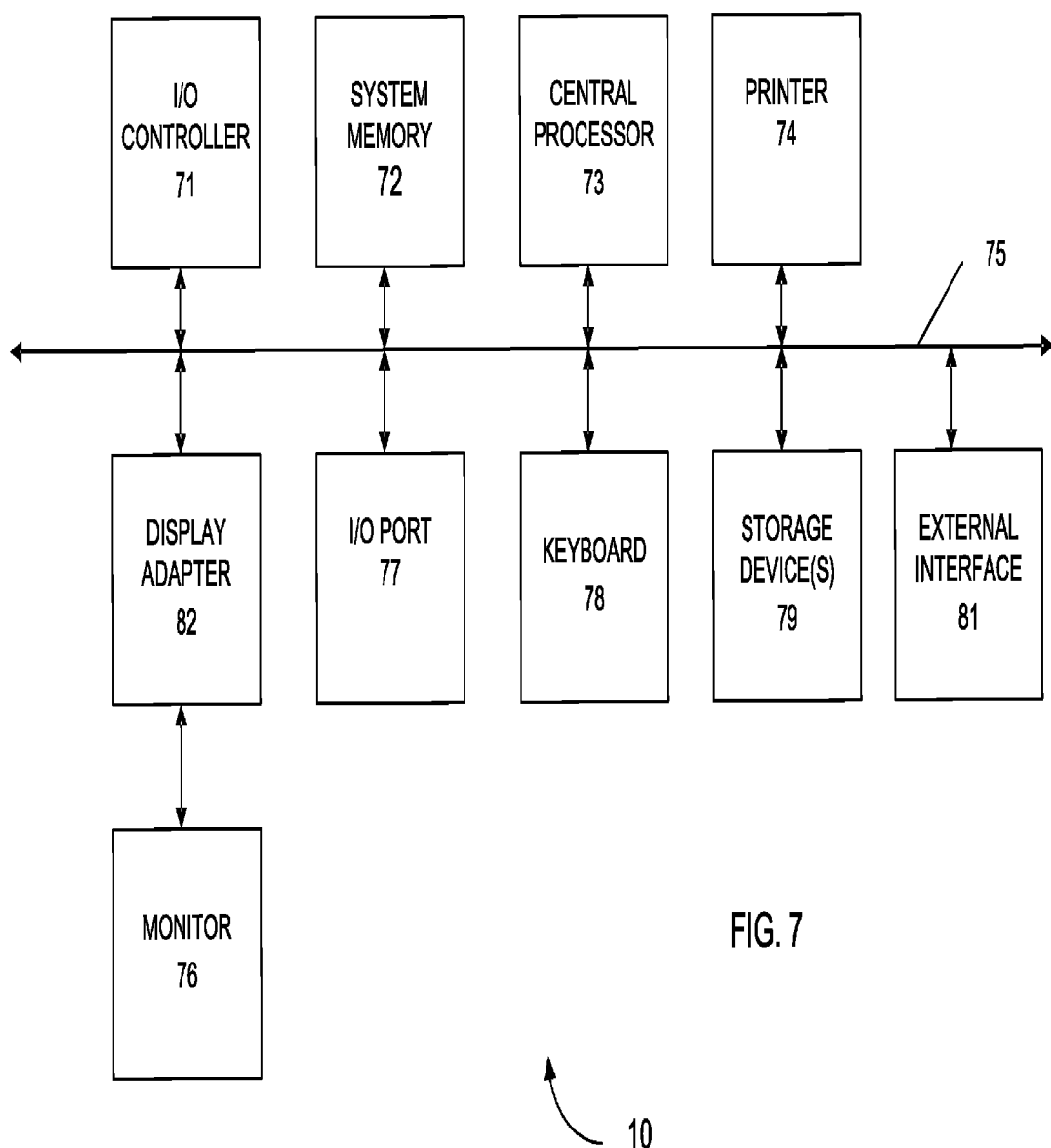
FIG. 7 shows a block diagram of an example computer system usable with system and methods according to embodiments of the present invention.

Any of the computer systems mentioned herein may utilize any suitable number of subsystems. Examples of such subsystems are shown in FIG. 7 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of managing routes of data traffic within a network, the method comprising performing, by a computer system:
   providing a user interface for a user to input an address and a first routing action;
   receiving the address and the first routing action via the user interface;
   updating a configuration file to specify the first routing action to be performed by a border router associated with the address;
   converting the configuration file into router management commands to be performed by the border router associated with the address based on the first routing action; and
   sending the router management commands to the border router of a plurality of border routers of the network.

2. The method as recited in claim 1, wherein the address is a source address.

3. The method as recited in claim 1, wherein the address is a destination address.

4. The method as recited in claim 1, wherein updating the configuration file includes adding the address to the configuration file.

5. The method as recited in claim 1, wherein the computer system is a server.

6. The method as recited in claim 5, wherein the router management commands are Border Gateway Protocol (BGP) commands, and wherein the server acts as BGP speaker.

7. The method as recited in claim 1, wherein the computer system includes a server in a transmitting device, wherein the transmitting device converts the configuration file and sends the router management command.

8. The method as recited in claim 1, wherein the user interface provides a plurality of routing actions from which to select.

9. The method as recited in claim 8, wherein the plurality of routing actions includes a null routing action.

10. The method as recited in claim 8, wherein the plurality of routing actions includes a diversion routing action that specifies a computing device within the network that is not a destination address.

11. The method as recited in claim 8, wherein the plurality of routing actions includes a discard routing action, where the discard routing action occurs at the plurality of border routers.

12. The method as recited in claim 10, wherein a computing device filters network traffic based on rules.

13. The method as recited in claim 12, wherein the filtering mitigates denial of service attacks on the destination address.

14. The method as recited in claim 1, further comprising:
forwarding one or more router management commands from the plurality of border routers to one or more other routers based on the first routing action.

15. The method as recited in claim 1, wherein the address specifies a range of addresses.

16. The method as recited in claim 1, wherein the user interface displays a list of destination addresses and an associated routing action.

17. The method as recited in claim 16, wherein the user interface provides selection objects for editing or deleting the destination address from the list.

18. The method as recited in claim 16, wherein the user interface provides selection object to add a border router to which the router management commands are sent.

19. The method as recited in claim 16, wherein the user interface displays a time associated with each destination address on the list.

20. The method as recited in claim 19, with the time corresponds to how long the associated routing action has been performed for each destination address on the list.

21. The method as recited in claim 1, further comprising:
sending a message to each of the plurality of border routers; and
updating a status on the user interface based on responses from the border routers.

22. The method as recited in claim 21, further comprising:
sending an alert message to a system operator if no response is received from the border router.

23. The method as recited in claim 1, further comprising:
querying a routing log file for routing changes; and
adding any new route changes to a database of routing changes.

24. The method as recited in claim 1, wherein the address is a destination address, the method further comprising:
accessing a plurality of routing tables from a plurality of routers of the network to determine possible routes to the address, the plurality of routers including the plurality of border routers; and
displaying information about the possible routes to the address.

25. The method as recited in claim 24, wherein the information about the possible routes includes where the possible routes will exit the network.

26. The method as recited in claim 1, further comprising:
receiving credentials from the user; and
determining a type of account of the user from a plurality of account types based on the credentials, wherein one account type is a limited account that has allowed routing actions that are a subset of all routing actions allowed.

27. The method as recited in claim 26, further comprising:
displaying only allowed routing actions to a particular user that has the limited account.

28. A method of configuring routers, the method comprising performing, by a computer system:
providing a user interface for a user to specify a customer network and to input a routing action to route traffic to the customer network via a mitigation network, the customer network including a plurality of customer router addresses;
receiving, via the user interface, specification of the customer network and the routing action to route the traffic to the customer network via the mitigation network;
initiating one or more connections between the mitigation network and the customer network using a plurality of routing variables; and
sending, to the border router of a plurality of routing devices, router management commands to route the traffic destined for the customer network to the mitigation network, the plurality of routing devices being external to the mitigation network.

29. The method as recited in claim 28, wherein the customer network is specified as a plurality of network addresses.

30. The method as recited in claim 28, wherein the routing variables include a plurality of internal addresses.

31. The method as recited in claim 28, wherein the routing variables include a plurality of external addresses.

32. The method as recited in claim 28, wherein the connections are IP tunnels.

33. The method as recited in claim 32, wherein the user interface further includes a mechanism for inputting a plurality of routing variables and wherein the routing variables are used to initiate the IP tunnels.

34. The method as recited in claim 32, wherein the user interface further includes a mechanism for inputting the number of IP tunnels to be initiated.

35. The method as recited in claim 32, wherein the IP tunnels are GRE tunnels.

* * * * *